(12) United States Patent
Zhang et al.

(10) Patent No.: US 11,659,441 B2
(45) Date of Patent: May 23, 2023

(54) LOAD BALANCE METHOD AND APPARATUS THEREOF

(71) Applicant: Huawei Technologies Co., Ltd., Shenzhen (CN)

(72) Inventors: Shaoqian Zhang, Shenzhen (CN); Hua Wang, Shenzhen (CN); Junhui Gong, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 17/105,256

(22) Filed: Nov. 25, 2020

(65) Prior Publication Data

US 2021/0084537 A1 Mar. 18, 2021

Related U.S. Application Data (63) Continuation of application No. PCT/CN2018/125903, filed on Dec. 29, 2018.

(30) Foreign Application Priority Data

May 29, 2018 (CN) .......................... 201810531218.8

(51) Int. Cl.
*H04W 28/08* (2023.01)
*H04W 72/02* (2009.01)
(Continued)

(52) U.S. Cl.
CPC ..... *H04W 28/0842* (2020.05); *H04L 61/2596* (2013.01); *H04W 72/02* (2013.01); *H04W 72/52* (2023.01); *H04W 80/02* (2013.01)

(58) Field of Classification Search
CPC ............. H04W 28/0842; H04W 72/02; H04W 72/0486; H04W 80/02; H04W 72/52;
(Continued)

(56) References Cited

U.S. PATENT DOCUMENTS 8,953,623 B1 * 2/2015 Eyada ................... H04L 47/125
370/401
11,178,230 B1 * 11/2021 Sreenivasan .......... H04L 67/145
(Continued)

FOREIGN PATENT DOCUMENTS

CN 104780115 A 7/2015
CN 105045762 A 11/2015
(Continued)

*Primary Examiner* — Kan Yuen
(74) *Attorney, Agent, or Firm* — Leydig, Voit & Mayer, Ltd.

(57) ABSTRACT

Embodiments of this application provide a load balance method and an apparatus thereof. The method may include the following steps: receiving, by a load balance node, a first service request packet from a service request end, where the first service request packet includes address information of the service request end, address information of a to-be-processed load balance instance, and a MAC address of the load balance node; determining a to-be-processed service member based on the address information of the to-be-processed load balance instance, where the to-be-processed service member is configured to process the first service request packet; and modifying the MAC address of the load balance node in the first service request packet to a MAC address of the to-be-processed service member, to obtain a second service request packet, and sending the second service request packet to a computing node to which the to-be-processed service member belongs.

2 Claims, 4 Drawing Sheets

(51) Int. Cl.
*H04W 80/02* (2009.01)
*H04L 61/2596* (2022.01)
*H04W 72/52* (2023.01)

(58) Field of Classification Search
CPC ............. H04L 61/2521; H04L 61/2596; H04L 61/5053; H04L 2101/622; H04L 67/1023; H04L 47/125; H04L 69/324
See application file for complete search history.

(56) References Cited

U.S. PATENT DOCUMENTS

| | | | |
|---|---|---|---|
| 2003/0108052 A1* | 6/2003 | Inoue | H04L 61/2517 370/399 |
| 2012/0039338 A1* | 2/2012 | Morimoto | H04L 47/125 370/392 |
| 2017/0026462 A1* | 1/2017 | Yin | H04L 67/1027 |
| 2018/0131617 A1 | 5/2018 | Hira | |
| 2018/0183865 A1* | 6/2018 | Pullela | H04L 47/125 |
| 2018/0198854 A1* | 7/2018 | Rong | H04L 47/125 |
| 2018/0332105 A1* | 11/2018 | Huang | H04L 67/1038 |

FOREIGN PATENT DOCUMENTS

| | | |
|---|---|---|
| CN | 106713499 A | 5/2017 |
| CN | 106790675 A | 5/2017 |
| CN | 107094119 A | 8/2017 |
| CN | 108449282 A | 8/2018 |
| WO | 2017116399 A1 | 7/2017 |

\* cited by examiner

LOAD BALANCE METHOD AND APPARATUS THEREOF

CROSS-REFERENCE TO RELATED APPLICATIONS

This application is a continuation of International Application No. PCT/CN2018/125903, filed on Dec. 29, 2018, which claims priority to Chinese Patent Application No. 201810531218.8, filed on May 29, 2018. The disclosures of the aforementioned applications are hereby incorporated by reference in their entireties.

TECHNICAL FIELD

Embodiments of this application relate to the communications technologies field, and specifically, to a load balance method and an apparatus thereof.

BACKGROUND

A load balance (LB) technology refers to evenly allocating, by using a load balance technology (e.g., polling or a minimum connection quantity), service requests sent by an external system to a server in a symmetric structure (e.g., a resource pool). The server that receives the service requests independently processes and responds to the requests. When a quantity of users and application access requests increase, more servers are required to process and respond to the requests. In this case, a load balancer needs to distribute the service requests to a plurality of servers according to a rule, to implement horizontal service expansion.

Figure 1:
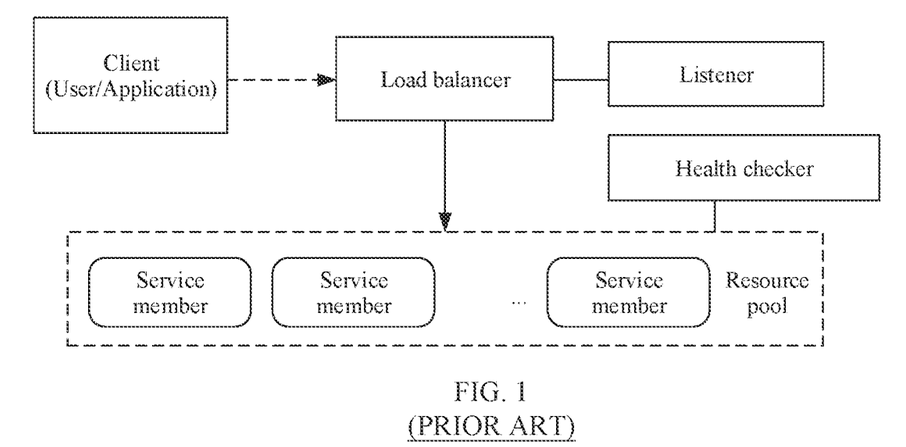
FIG. 1 is a schematic diagram of a load balance system.

FIG. 1 is a schematic diagram of a load balance system. The load balance system generally includes five parts: a load balancer, a listener, a resource pool, a health checker, and a service member. The load balancer forwards a request and selects a resource pool and a service member. The listener is a set of listening information and listening rules, including a protocol type, a listening port, and an access connection quantity limit. The resource pool is a collection of the service members having same or similar functions. The service member can be a virtual machine or a physical machine. Each resource pool is configured with one or more health checkers, which are used to check a status of each service member port in the resource pool. A plurality of listeners can be configured for one load balancer, to connect to a plurality of resource pools, in other words, one load balancer can provide load balance forwarding services for a plurality of services at the same time. Generally, a virtual internet protocol (VIP) address of a service is configured in the load balancer. When accessing the service, a client sends a service request packet to the VIP address. After receiving the service request packet from the client, the load balancer first checks a listener corresponding to the service request packet, and searches for a corresponding resource pool. Then, a service member is selected from the resource pool according to a specific load balance algorithm or rule to process the access request. A related operation is performed on the service request packet, for example, network address translation (NAT) or packet overlay encapsulation. The service request packet is transmitted through a tunnel protocol. Finally, the service request packet is forwarded to the selected service member. After processing the access request, the service member returns a response to the client.

With development of cloud computing related technologies, a load balancer is more widely applied to a data center. In addition, a higher requirement is imposed on the load balancer, which is mainly reflected in transparent transmission of a source internet protocol (IP) address (which may be a client IP address), supporting multi-tenant, implementing high-performance forwarding, and the like. Currently, two load balance solutions are mainly used to implement transparent transmission of the source IP address: a load balance solution in a full network address translation (Full NAT) mode and a load balance solution in a direct return (DR) mode.

In the load balance solution in the full network address translation mode, the load balancer stores the source IP address (namely, the client IP address) of the service request packet sent by the client into a specific field of a header of the service request packet, or places the source IP address into a valid payload part of the service request packet, performs source IP network address translation (SNAT) and destination IP network address translation (DNAT) on the service request packet, and forwards the translated service request packet to a physical node of the service member. This implements transparent transmission of the source IP address. However, in this solution, the specific field or the valid payload in the service request packet needs to be modified, and a check value of the service request packet needs to be recalculated. Therefore, a relatively large performance loss is caused. In addition, an operating system of the service member further needs to be modified, so that the operating system of the service member can support processing of the service request packet.

In the load balance solution in the DR mode, the load balancer performs DNAT on the service request packet sent by the client, encapsulates the service request packet in an IP-in-IP tunnel, and forwards the service request packet to the physical node of the service member. This implements transparent transmission of the source IP address.

In both the foregoing two solutions, the service request packet is forwarded, by using DNAT, to the physical node of the service member, and the physical node forwards, based on the translated destination IP address, the service request packet to a service member corresponding to the destination IP address. When different service members on a same physical node have a same IP address, the service request packet may be incorrectly forwarded. This affects access of the client. For example, a service request packet that should be forwarded to a service member 1 is forwarded to a service member 2. The service member 1 and the service member 2 belong to the same physical node and have the same IP address.

It can be learned that when the current load balance solution implements transparent transmission of the source IP address, this solution may lead to great performance loss, and the service request packet may further be incorrectly forwarded.

SUMMARY

To resolve the technical problems, embodiments of this application provide a load balance method and an apparatus thereof, to ensure that a service request packet can be correctly forwarded, and transparent transmission of source address information can be implemented without affecting performance.

According to a first aspect of an embodiment of this application, a load balance method is provided, including the following steps:

receiving, by a load balance node, a first service request packet from a service request end, where the first service request packet includes address information (namely, source address information) of the service request end, address information (namely, destination address information) of a to-be-processed load balance instance, and a media access control (MAC) address (namely, a destination MAC address) of the load balance node, and the to-be-processed load balance instance is a load balance instance configured on the load balance node;

determining, by the load balance node, a to-be-processed service member based on the address information of the to-be-processed load balance instance, where the to-be-processed service member is configured to process the first service request packet;

modifying, by the load balance node, the MAC address of the load balance node in the first service request packet to a MAC address of the to-be-processed service member, to obtain a second service request packet, where the second service request packet includes the address information of the service request end, the address information of the to-be-processed load balance instance, and the MAC address of the to-be-processed service member; and sending, by the load balance node, the second service request packet to a computing node to which the to-be-processed service member belongs.

According to the first aspect of an embodiment of this application, the load balance node modifies the destination MAC address in the first service request packet, so that the service request packet can be correctly forwarded. When the destination MAC address is modified, and the source address information is not modified, transparent transmission of the source address information can be implemented. In addition, in a process of implementing the transparent transmission of the source address information, a field or a valid payload in the service request packet is not modified, and an operating system of a service member does not need to be modified, and this does not lead to performance loss.

The first service request packet is a service request packet sent by the service request end to the load balance node. The second service request packet is a service request packet obtained after the load balance node processes the first service request packet, and the load balance node sends the second service request packet to the computing node. The third service request packet is a service request packet obtained after the computing node processes the second service request packet, and the computing node sends the third service request packet to the to-be-processed service member. The to-be-processed service member processes the third service request packet, to indirectly implement processing of the first service request packet.

The address information may include an IP address and a port identifier.

In a possible implementation, the load balance node queries, based on the IP address and the port identifier of the to-be-processed load balance instance, namely, the destination address information in the first service request packet, a resource pool corresponding to the to-be-processed load balance instance, and then selects, according to a load balance algorithm corresponding to the resource pool, the to-be-processed service member from the resource pool, so that the to-be-processed service member is determined based on the destination address information carried in the first service request packet.

The load balance node may determine the to-be-processed service member based on configuration information delivered by a load balancer and the destination address information carried in the first service request packet, so as to quickly and accurately determine the to-be-processed service member.

The configuration information may include load balance instance information, listener information, resource pool information, service member information, and the like. The load balance instance information includes a virtual IP address, a tenant identifier, an instance identifier, instance description information, an instance status, a subnet related to the virtual IP address, and the like of the load balance instance. The listener information includes a listening protocol identifier, a listened port identifier, a maximum connection quantity limit, a bound resource pool identifier, an instance identifier of an associated load balance instance, a tenant identifier of a tenant, and the like. The resource pool information includes a resource pool status, a protocol type, a load balance algorithm, an identifier of an associated health checker, an identifier of at least one service member, and the like. The service member information includes a tenant identifier of a tenant of a service member, a subnet related to the service member, a weight value, a protocol number, an IP address of the service member, a MAC address of the service member, and the like.

In a possible implementation, when obtaining the destination address information from the first service request packet, the load balance node does not know a load balance instance to which the destination address information corresponds to. Therefore, the load balance node needs to first determine the to-be-processed load balance instance corresponding to the destination IP address, then queries, based on the destination port identifier, a listener associated with the to-be-processed load balance instance, queries a resource pool bound to the listener, determines the resource pool as the resource pool corresponding to the to-be-processed load balance instance, and selects the to-be-processed service member from the resource pool according to the load balance algorithm corresponding to the resource pool.

The process may be performed with reference to the foregoing configuration information, in other words, the to-be-processed load balance instance corresponding to the destination IP address is determined with reference to the load balance instance information, the listener associated with the to-be-processed load balance instance is queried with reference to the listener information, and the resource pool bound to the listener is queried with reference to the listener information, the to-be-processed service member is selected with reference to the resource pool information.

In a possible implementation, before sending the second service request packet to the computing node, the load balance node may encapsulate the second service request packet. The encapsulation may be overlay encapsulation.

According to a second aspect of an embodiment of this application, a load balance node is provided, and the load balance node has a function of implementing the method provided in the first aspect. The function may be implemented by hardware, or may be implemented by hardware executing corresponding software. The hardware or the software includes one or more units corresponding to the foregoing function.

In a possible implementation, the load balance node includes a transceiver unit and a processing unit. The transceiver unit is configured to receive a first service request packet from a service request end. The first service request packet includes address information of the service request end, address information of a to-be-processed load balance instance, and a MAC address of the load balance node. The to-be-processed load balance instance is a load balance instance configured on the load balance node. The processing unit is configured to determine a to-be-processed service member based on the address information of the to-be-processed load balance instance. The to-be-processed service member is configured to process a service request packet related to the first service request packet. The processing unit is further configured to modify the MAC address of the load balance node in the first service request packet to a MAC address of the to-be-processed service member, to obtain a second service request packet. The second service request packet includes the address information of the service request end, the address information of the to-be-processed load balance instance, and the MAC address of the to-be-processed service member. The transceiver unit is further configured to send the second service request packet to a computing node to which the to-be-processed service member belongs.

In a possible implementation, the load balance node includes a processor, a transceiver, and a memory. The transceiver is configured to receive and send information, the memory stores a computer-executable instruction, the processor is connected to the memory and the transceiver by using a bus, and when the processor executes the computer-executable instruction stored in the memory, the load balance node is enabled to perform the following steps: receiving a first service request packet from a service request end, where the first service request packet includes address information of the service request end, address information of a to-be-processed load balance instance, and a MAC address of the load balance node, and the to-be-processed load balance instance is a load balance instance configured on the load balance node; determining a to-be-processed service member based on the address information of the to-be-processed load balance instance, where the to-be-processed service member is configured to process a service request packet related to the first service request packet; modifying the MAC address of the load balance node in the first service request packet to a MAC address of the to-be-processed service member, to obtain a second service request packet, where the second service request packet includes the address information of the service request end, the address information of the to-be-processed load balance instance, and the MAC address of the to-be-processed service member; and sending the second service request packet to a computing node to which the to-be-processed service member belongs.

Based on a same inventive concept, for a problem-resolving principle and beneficial effects of the load balance node, refer to the method in the first aspect and beneficial effects brought by the method. Therefore, for implementation of the load balance node, refer to implementation of the method. No repeated description is provided.

According to a third aspect of an embodiment of this application, a computer-readable storage medium is provided. The computer-readable storage medium stores an instruction, and when the instruction is run on a computer, the computer is enabled to perform the method according to the first aspect.

According to a fourth aspect of an embodiment of this application, a computer program product including an instruction is provided. When the computer program product runs on a computer, the computer is enabled to perform the method according to the first aspect.

According to a fifth aspect of an embodiment of this application, a load balance method is provided, including the following steps:

receiving, by a computing node, a second service request packet from a load balance node, where the second service request packet includes address information of a service request end, address information of a to-be-processed load balance instance, and a MAC address of a to-be-processed service member, the to-be-processed load balance instance is a load balance instance configured on the load balance node, the second service request packet is obtained by the load balance node by modifying a MAC address of the load balance node in a first service request packet, and the first service request packet is a service request packet sent by the service request end to the load balance node;

modifying, by the computing node based on configuration information, the address information of the to-be-processed load balance instance in the second service request packet to address information of the to-be-processed service member, to obtain a third service request packet; and sending, by the computing node, the third service request packet to the to-be-processed service member based on the MAC address of the to-be-processed service member.

According to a fifth aspect of an embodiment of this application, a computing node receives a second service request packet carrying a MAC address of a to-be-processed service member, modifies destination address information of the second service request packet (modifies address information of a to-be-processed load balance instance to address information of the to-be-processed service member), to obtain a third service request packet, and sends the third service request packet to the to-be-processed service member based on the MAC address of the to-be-processed service member, so that the third service request packet can be correctly forwarded, and transparent transmission of address information of a service request end can be further implemented, to be specific, transparent transmission of source address information can be further implemented, without affecting performance.

In a possible implementation, configuration information is delivered by a load balancer to the computing node, and the configuration information includes a mapping relationship between the address information of the load balance instance and address information of a service member deployed on the computing node, to be specific, includes the mapping relationship between the address information of all load balance instances configured on the load balance node and the address information of service members corresponding to the load balance instances on the computing node. The mapping relationship may be a one-to-one relationship, to be specific, address information of one load balance instance corresponds to address information of one service member, or may be a many-to-one relationship, to be specific, address information of a plurality of load balance instances may correspond to address information of one service member.

The address information includes an IP address and a port identifier.

In a possible implementation, after modifying the address information of the to-be-processed load balance instance in the second service request packet to the address information of the to-be-processed service member, the computing node may record connection information. The connection information may include the source address information (namely, the address information of the service request end), the address information of the to-be-processed load balance instance, and the address information of the to-be-processed service member, in other words, the recorded connection information describes address information of a link of the service request packet from the service request end to the load balance instance of the load balance node and then to the to-be-processed service member, so that when receiving a service response packet from the to-be-processed service member, the computing node can directly determine the address information of the service request end, and quickly forwards the service response packet to the service request end.

In a possible implementation, when receiving the second service request packet, the computing node decapsulates the second service request packet. The decapsulation may be overlay decapsulation.

In a possible implementation, the computing node receives a service response packet from the to-be-processed service member, where source address information included in the service response packet is the address information of the to-be-processed service member; modifies the address information of the to-be-processed service member in the service response packet to the address information of the to-be-processed load balance instance based on the connection information, in other words, the source network address is translated, and sends the modified service response packet to the service request end based on the connection information. Because the service response packet does not pass through the load balance node, the computing node directly sends the service response packet to a client by using a router, so that the service request packet can be quickly responded.

In a possible implementation, the computing node may encapsulate the modified service response packet, and then sends the modified and encapsulated service response packet to the service request end.

According to a sixth aspect of an embodiment of this application, a computing node is provided, and the computing node has a function of implementing the method provided in the fifth aspect. The function may be implemented by hardware, or may be implemented by hardware executing corresponding software. The hardware or the software includes one or more units corresponding to the foregoing function.

In a possible implementation, the computing node includes a transceiver unit and a processing unit. The transceiver unit is configured to receive a second service request packet from a load balance node. The second service request packet includes address information of a service request end, address information of a to-be-processed load balance instance, and a MAC address of a to-be-processed service member. The to-be-processed load balance instance is a load balance instance configured on the load balance node. The second service request packet is obtained by the load balance node by modifying a MAC address of the load balance node in a first service request packet. The first service request packet is a service request packet sent by the service request end to the load balance node. The processing unit is configured to modify the address information of the to-be-processed load balance instance in the second service request packet to address information of the to-be-processed service member based on configuration information, to obtain a third service request packet. The transceiver unit is further configured to send the third service request packet to the to-be-processed service member based on the MAC address of the to-be-processed service member.

In a possible implementation, the computing node includes a processor, a transceiver, and a memory. The transceiver is configured to receive and send information, the memory stores a computer-executable instruction, the processor is connected to the memory and the transceiver by using a bus, and when the processor executes the computer-executable instruction stored in the memory, the computing node is enabled to perform the following steps: receiving a second service request packet from a load balance node, where the second service request packet includes address information of a service request end, address information of a to-be-processed load balance instance, and a MAC address of a to-be-processed service member, the to-be-processed load balance instance is a load balance instance configured on the load balance node, the second service request packet is obtained by the load balance node by modifying a MAC address of the load balance node in a first service request packet, and the first service request packet is a service request packet sent by the service request end to the load balance node; modifying the address information of the to-be-processed load balance instance in the second service request packet to address information of the to-be-processed service member based on configuration information, to obtain a third service request packet; and sending the third service request packet to the to-be-processed service member based on the MAC address of the to-be-processed service member.

Based on a same inventive concept, for a problem-resolving principle and beneficial effects of the computing node, refer to the method in the fifth aspect and beneficial effects brought by the method. Therefore, for implementation of the computing node, refer to implementation of the method. No repeated description is provided.

According to a seventh aspect of an embodiment of this application, a computer-readable storage medium is provided. The computer-readable storage medium stores an instruction, and when the instruction is run on a computer, the computer is enabled to perform the method according to the fifth aspect.

According to an eighth aspect of an embodiment of this application, a computer program product including an instruction is provided. When the computer program product runs on a computer, the computer is enabled to perform the method according to the fifth aspect.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes in detail, with reference to the accompanying drawings, the load balance method and the apparatus thereof that are provided in the embodiments of this application.

Figure 2:
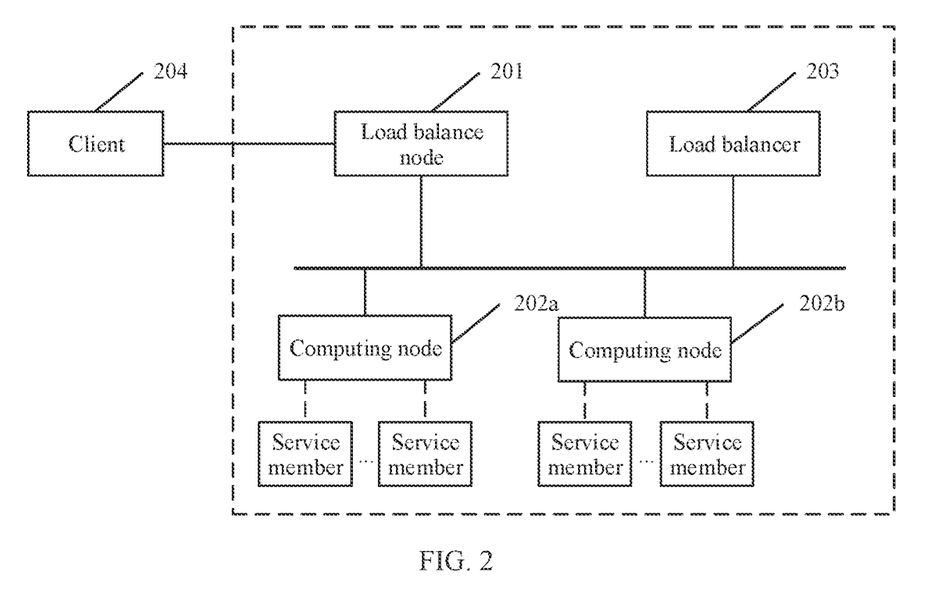
FIG. 2 is a schematic diagram of a network architecture of a load balance system to which an embodiment of this application is applied.

FIG. 2 is a schematic diagram of a network architecture of a load balance system to which an embodiment of this application is applied. The schematic diagram may be a schematic diagram of a network architecture of a load balance system in a cloud data center, or may be a schematic diagram of a network architecture of a load balance system in another data center.

A part in a dashed box in FIG. 2 is a data center, which may be the cloud data center or the other data center. The data center may include a load balance node 201, a computing node 202a, a computing node 202b, and a load balancer 203. These nodes or devices communicate with each other in the data center by using an internal network. The internal network is used by the data center, and can implement internal communication in the data center. It should be noted that at least one computing node may be deployed in the data center. In FIG. 2, two computing nodes are used as an example for description, and do not constitute a limitation on this embodiment of this application.

A client 204 in FIG. 2 communicates with the load balance node 201 by using a public network. For example, the client 204 sends a service request packet to the load balance node 201. The client 204 may be an application such as an application program, a browser that can access the internet and that is on a terminal device. There are servers corresponding to the client 204 on a server side. The servers may be service members deployed on the computing nodes. The terminal device may be user equipment (UE), and the user equipment may include but is not limited to a terminal such as a mobile phone, a desktop computer, a palmtop computer, or a notebook computer.

When the client 204 is connected to the public network, the client 204 may communicate with the load balance node 201 by using a router. In this embodiment of this application, when the communication between the client 204 and the load balance node 201 is described, the router between the client 204 and the load balance node 201 is omitted, in other words, processing performed by the router when transmitting a packet between the client 204 and the load balance node 201 is not considered. In an actual application, the router processes the packet between the client 204 and the load balance node 201.

In this embodiment of this application, when receiving an access instruction, the client 204 sends the service request packet to the load balance node 201, so that the servers respond to the service request packet, to perform service data transmission, and the like.

A name of the service request packet does not constitute a limitation on this embodiment of this application, and may also be referred to as an access request packet, an access request data packet, a service request data packet, an access request, or the like.

The load balance node 201 in FIG. 2 is deployed on a load balance physical node, and the load balance physical node is a load balancer that is actually applied. The load balance node 201 is responsible for receiving and analyzing the service request packet, determining a load balance instance of the service request packet, locating a listener, selecting a service member, modifying the service request packet, forwarding the service request packet, and the like. The load balance node 201 may be an elastic load balance (ELB) node, or may be another type of a load balance node. The ELB node is used as an example for description in this embodiment of this application.

One or more load balance instances may be configured or deployed on the load balance node 201. In other words, the load balance node 201 may include one or more load balance instances, and one VIP may be configured for one load balance instance. It may be understood that the load balance instance may implement a function of the load balancer. The load balance instance may be an ELB instance, or may be another type of load balance instance. The ELB instance is used as an example for description in this embodiment of this application.

The load balancer 203 in FIG. 2 may be deployed on the load balance physical node, or may be independent of the load balance physical node. The load balancer 203 is responsible for receiving an operation instruction, operation information, and the like that are entered by an administrator, performing a corresponding operation, and delivering related configuration information to the load balance node 201 and the computing nodes. The load balancer may be an ELB controller, or may be another type of load balancer. In this embodiment of this application, the ELB controller is used as an example for description.

The computing nodes in FIG. 2 may be physical nodes to which the service member belongs. A load balance agent (an ELB agent) can be deployed on the computing nodes. The ELB agent matches, modifies, and forwards the service request packet based on the configuration information delivered by the ELB controller. To be specific, the ELB agent is responsible for forwarding the service request packet sent by the ELB node to a corresponding service member, so that the service member can process the service request packet. A specific quantity of the computing nodes deployed in the data center is determined based on a situation, and is not limited in this embodiment of this application.

One or more service members may be deployed on the computing nodes. For example two service members are deployed on the computing node 202a in FIG. 2. The service members may be virtual machines or physical machines, and are responsible for processing the service request packet, for example, responding to the service request packet. It may be understood that the service member is a back-end service member, in other words, is invisible to a front end (namely, the client). Different service members on a same computing node may have a same IP address. For example, two service members deployed on the computing node 202a have the same IP address. The name of the service member does not constitute a limitation on this embodiment of this application, and may also be referred to as a server, a back-end server, a virtual server, or the like.

The following describes names or terms used in the embodiments of this application.

Address information may include an IP address, and may further include a port identifier, namely, a port number. The address information may be classified into source address information and destination address information. The source address information is used to describe address information of a transmit end of a data packet or a packet. The destination address information is used to describe address information of a receive end of the data packet or the packet.

The address information may also include a media access control (MAC) address. The MAC address is fixed, and different devices have different MAC addresses. In this embodiment of this application, the MAC addresses are used to distinguish between service members having a same IP address, so that the data packet or the packet can be correctly forwarded. Alternatively, the MAC address may not be included in the address information, in other words, the MAC address is independent of the address information. Specifically, whether the MAC address is included in the address information depends on a definition of the address information. In this embodiment of this application, an example in which the MAC address is independent of the address information is used for description.

The service request packet is sent by the service request end, and is used to request to access the internet or request a network resource. The service request end may be the client in FIG. 2, or may be a service member in the data center, or the like. In this embodiment of this application, an example in which the service request end is a client is used for description.

A service response packet is sent by the service member, to respond to the service request packet.

The to-be-processed load balance instance is a load balance instance requested by the service request packet sent by the service request end, and is a load balance instance configured on the load balance node. It should be noted that the name of the to-be-processed load balance instance does not constitute a limitation on this embodiment of this application.

A to-be-processed service member is a service member that is determined by the load balance node and that is used to process the service request packet, is a service member deployed on the computing node. It should be noted that the name of the to-be-processed service member does not constitute a limitation on this embodiment of this application.

In view of disadvantages of the current load balance solution, a load balance method and an apparatus thereof are provided in an embodiment of this application, so that a service request packet can be correctly forwarded, and transparent transmission of source address information can be implemented without affecting performance.

The following describes in detail the load balance method provided in this embodiment of this application.

Figure 3:
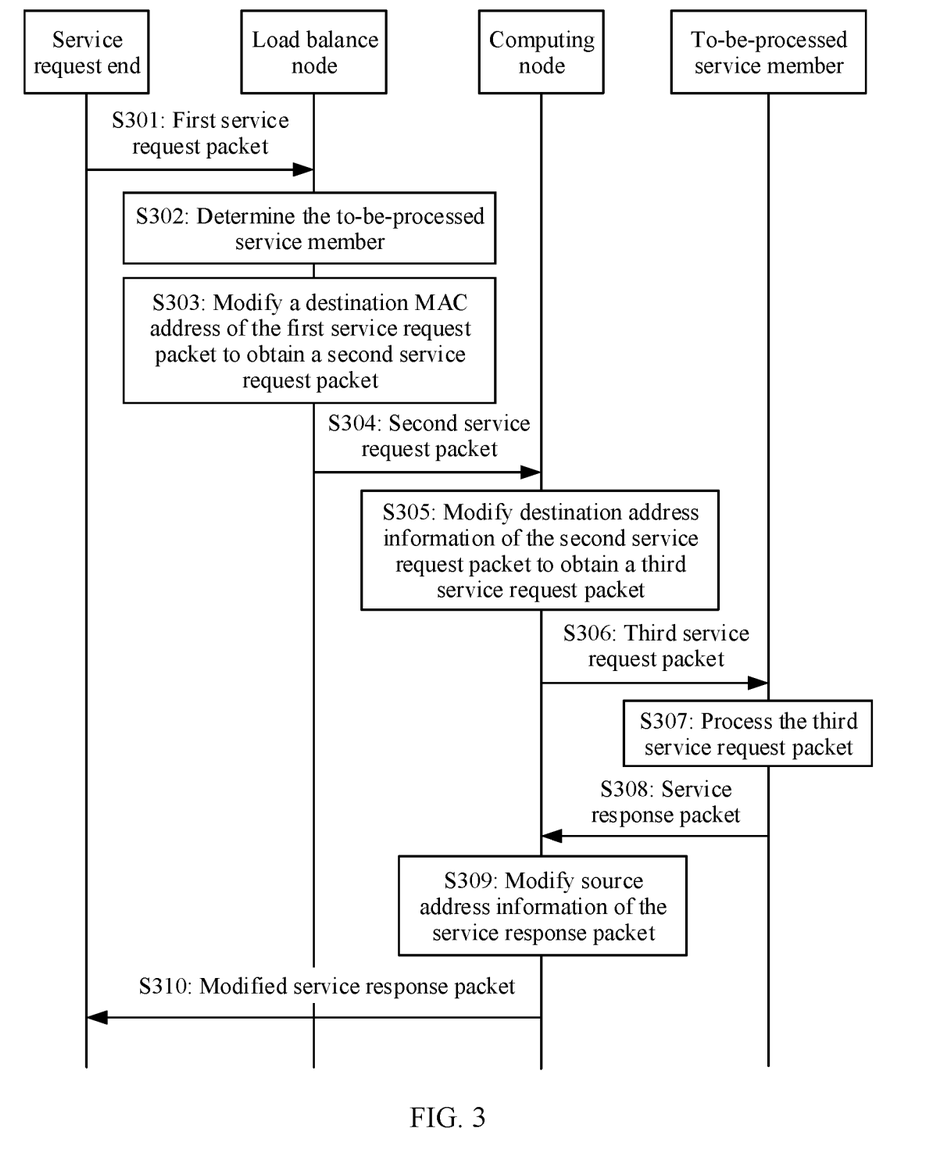
FIG. 3 is a schematic flowchart of a load balance method according to an embodiment of this application.

FIG. 3 is a schematic flowchart of a load balance method according to an embodiment of this application. The method is described from a perspective of interaction among a load balance node, a computing node, and a service member. The method may include but is not limited to the following steps.

Step S301: A service request end sends a first service request packet to a load balance node. The first service request packet includes source address information, destination address information, and a destination MAC address. Correspondingly, the load balance node receives the service request packet from the service request end.

The service request end may be the client in FIG. 2, or may be a service member in a data center, or the like.

When receiving an access instruction, the service request end sends the first service request packet to the load balance node. The first service request packet includes the source address information, the destination address information, and the destination MAC address.

The source address information is address information of the service request end, and may include an IP address and a port identifier of the service request end. For example, the address information of the service request end includes an IP address of the client and a port identifier of the client.

The destination address information is address information of a load balance instance requested by the first service request packet, and may include a destination IP address and a destination port identifier. The load balance instance is referred to as a to-be-processed load balance instance, and the destination IP address is an IP address of the to-be-processed load balance instance, and the destination port identifier is a port identifier of the to-be-processed load balance instance. For any load balance instance, the IP address of the load balance instance may be a VIP address of the load balance instance, or may be another accessible IP address of the load balance instance.

Before reaching the load balance node, the service request packet sent by the service request end may pass through one or more routers. In this process, the destination MAC address carried in the service request packet is a MAC address of a next-hop router. However, when the next-hop of the service request packet is the load balance node, the destination MAC address carried in the service request packet is a MAC address of the load balance node. In this embodiment of this application, the destination MAC address carried in the first service request packet received by the load balance node is the MAC address of the load balance node.

Step S302: The load balance node determines a to-be-processed service member based on the address information of the to-be-processed load balance instance.

The to-be-processed service member is configured to process the first service request packet, which actually processes a third service request packet, to indirectly implement processing of the first service request packet. In this embodiment of the present disclosure, the first service request packet is the service request packet sent by the service request end to the load balance node. A second service request packet is a service request packet obtained after the load balance node processes the first service request packet, and the load balance node sends the second service request packet to the computing node. The third service request packet is a service request packet obtained after the computing node processes the second service request packet, and the computing node sends the third service request packet to the to-be-processed service member.

In a possible implementation, the load balance node determines the to-be-processed service member based on the IP address and the port identifier of the to-be-processed load balance instance.

The load balance node queries, based on the IP address and the port identifier of the to-be-processed load balance instance, a resource pool corresponding to the to-be-processed load balance instance. A load balance algorithm may be configured for each resource pool. When the resource pool is determined, the load balance node may select, according to the load balance algorithm configured for the resource pool, one of at least one service member corresponding to the resource pool as the to-be-processed service member.

The load balance node may determine the to-be-processed service member based on configuration information delivered by a load balancer and the IP address and the port identifier of the to-be-processed load balance instance.

The configuration information may include load balance instance information, listener information, resource pool information, service member information.

The load balance instance information is used to describe attribute information of each load balance instance, and may include a VIP address of each load balance instance. The VIP address of each load balance instance is different. It may be understood that different load balance instances have different VIP addresses. The load balance instance information further includes a tenant identifier, an instance identifier, instance description information, an instance status, a subnet of the VIP of each load balance instance, and the like. The tenant identifier is used to identify a tenant of the load balance instance. The instance identifier may be an instance name, an instance ID, or the like, and is used to identify a specific load balance instance. The instance description information is used to describe an action or a function of the load balance instance. The instance status indicates whether the load balance instance is in a working state or idle state.

The listener information is used to describe attribute information of each listener. The attribute information of each listener may include a listening protocol identifier, a port identifier, a maximum connection quantity limit, a bound resource pool identifier, an instance identifier of an associated load balance instance, a tenant identifier of a tenant, and the like. The listening protocol identifier can be a listening protocol number or a listening protocol version.

The resource pool information is used to describe attribute information of each resource pool, the attribute information of each resource pool may include a resource pool status, a protocol type used by the resource pool, a load balance algorithm corresponding to the resource pool, an identifier of a health checker associated with the resource pool, an identifier of each service member in at least one service member corresponding to the resource pool, and the like. At least one service member corresponding to a resource pool is at least one service member included in the resource pool.

The service member information is used to describe attribute information of each service member. The attribute information of each service member may include a tenant identifier of a tenant, a subnet related to the service member, a weight value, a protocol number, an IP address, a port identifier, a MAC address, and the like that are of the service member.

The configuration information may further include health checker information. The health checker information may include a health checker identifier, a health check frequency, a health check method, and the like. The health check frequency indicates an interval for the health checker to check health of the service member. The health check method may include an internet control message protocol (ICMP) check (e.g., ping check), a transmission control protocol (TCP) check, a hypertext transfer protocol (HTTP) check, and the like. After checking the service member, the health checker sends a check result (e.g., an indication of whether the service member works properly) to the load balancer. The load balancer determines whether to remove the service member based on the check result.

A step of determining, by the load balance node, the to-be-processed service member based on the configuration information and with reference to the IP address and the port identifier of the to-be-processed load balance instance may include the following:

A. The load balance node may obtain the destination address information from the first service request packet, but does not know the destination address information corresponds to a load balance instance to which the destination address information corresponds to. Therefore, the load balance node needs to first determine the to-be-processed load balance instance. The load balance node may query the to-be-processed load balance instance based on the destination IP address (to be specific, the IP address of the to-be-processed load balance instance carried in the first service request packet) and the load balance instance information. If the destination IP address is a same as an IP address of a load balance instance, the load balance instance is determined as the to-be-processed load balance instance.

B. When determining the to-be-processed load balance instance, the load balance node may query, based on the destination port identifier and the listener information, a listener associated with the to-be-processed load balance instance. If the target port identifier is a same as an identifier of a port listened on by a listener, the listener is determined as the listener associated with the to-be-processed load balance instance, a resource pool identifier bound to the listener is further determined, and a resource pool identified by the resource pool identifier is determined as the resource pool corresponding to the to-be-processed load balance instance.

C. When the resource pool is determined, the load balance node queries, with reference to the resource pool information, the load balance algorithm corresponding to the resource pool, and determines the to-be-processed service member from the resource pool.

Step S303: The load balance node modifies the MAC address of the load balance node in the first service request packet to a MAC address of the to-be-processed service member, to obtain the second service request packet.

When determining the to-be-processed service member, the load balance node may obtain the MAC address of the to-be-processed service member based on the service member information, and modifies the MAC address of the load balance node in the first service request packet to the MAC address of the to-be-processed service member, to be specific, modifies the destination MAC address in the first service request packet to the MAC address of the to-be-processed service member, to obtain the second service request packet. The second service request packet includes the source address information, the destination address information, and the MAC address of the to-be-processed service member, to be specific, includes the address information of the service request end, the address information of the to-be-processed load balance instance, and the MAC address of the to-be-processed service member.

It may be understood that the load balance node modifies the destination MAC address in the first service request packet, and does not modify and still retains other information. In other words, a difference between the first service request packet and the second service request packet lies in that the destination MACs are different.

Step S304: The load balance node sends the second service request packet to a computing node, where the computing node is a computing node to which the to-be-processed service member belongs. Correspondingly, the computing node receives the second service request packet from the load balance node.

Before sending the second service request packet to the computing node, the load balance node may encapsulate the second service request packet. The encapsulation may be overlay encapsulation, and a virtual extensible local area network (VXLAN) header and an outer packet header are encapsulated. The outer packet header includes an outer user datagram protocol (UDP), an outer IP address, and a layer 2 IP header. After the encapsulation is completed, the load balance node sends the encapsulated second service request packet to the computing node.

The computing node is a computing node to which the to-be-processed service member belongs, in other words, the to-be-processed service member is deployed on the computing node.

When receiving the second service request packet, the computing node decapsulates the second service request packet. The decapsulation may be overlay decapsulation. The outer UDP, the outer IP address, and the layer 2 IP header are removed, and the VXLAN header is removed, to obtain the source address information, the destination address information, and the MAC address of the to-be-processed service member, to be specific, to obtain the address information of the service request end, the address information of the to-be-processed load balance instance, and the MAC address of the to-be-processed service member.

Step S305: The computing node modifies the destination address information of the second service request packet to address information of the to-be-processed service member based on the configuration information, to obtain the third service request packet.

The configuration information is delivered by the load balancer, and the configuration information is different from the configuration information delivered by the load balancer to the load balance node. The configuration information delivered by the load balancer to the computing node may include a mapping relationship between address information of a load balance instance configured on the load balance node and address information of a service member deployed on the computing node, to be specific, includes a mapping relationship between address information of all load balance instances configured on the load balance node and address information of service members corresponding to the load balance instances on the computing node. The mapping relationship may be a one-to-one relationship, to be specific, address information of a load balance instance corresponds to address information of a service member. For example, the configuration information includes a mapping relationship between an IP address and a port number of a load balance instance 1 and an IP address and a port number of a service member 1; or may include a mapping relationship between an IP address of a load balance instance 1 and an IP address of a service member 1. The mapping relationship may also be a many-to-one relationship, to be specific, address information of a plurality of load balance instances may correspond to address information of one service member.

The computing node determines address information of the to-be-processed service member based on the configuration information, where the destination address information included in the second service request packet is the address information of the to-be-processed load balance instance, may determine the address information of the to-be-processed service member based on the configuration information and the address information of the to-be-processed load balance instance, and modifies the destination address information of the second service request packet from the address information of the to-be-processed load balance instance to the address information of the to-be-processed service member, to obtain the third service request packet. The third service request packet includes the source address information (namely, the address information of the service request end), the address information of the to-be-processed service member, and the MAC address of the to-be-processed service member.

In a possible implementation, after modifying the destination address information, the computing node records connection information. The connection information may include the source address information (namely, the address information of the service request end), the address information of the to-be-processed load balance instance, and the address information of the to-be-processed service member, in other words, the recorded connection information describes address information of a link of the service request packet from the service request end to the load balance instance of the load balance node and then to the to-be-processed service member, so that when receiving the service response packet from the to-be-processed service member, the computing node can directly determine the address information of the service request end (for example, the client), and quickly forwards the service response packet to the service request end.

The connection information may be obtained through a correspondence (which may be obtained from the second service request packet) between the source address information and the address information of the to-be-processed load balance instance, and a correspondence (which may be obtained from the configuration information) between the address information of the to-be-processed load balance instance and the address information of the to-be-processed service member.

Step S306: The computing node sends the third service request packet to the to-be-processed service member based on the MAC address of the to-be-processed service member. Correspondingly, the to-be-processed service member receives the third service request packet from the computing node.

The computing node sends the third service request packet to the to-be-processed service member based on the MAC address of the to-be-processed service member, in other words, sends the third service request packet to the service member corresponding to the MAC address. Because different service members have different MAC addresses, two service members do not have a same MAC address. In this way, the service request packet can be correctly forwarded, and the service request packet can be avoided to be forwarded to another service member having the same IP address.

Step S307: The to-be-processed service member processes the third service request packet.

When receiving the third service request packet, the to-be-processed service member processes the third service request packet, for example, parses the third service request packet, and obtains a corresponding network resource based on the third service request packet.

Step S308: The to-be-processed service member sends a service response packet to the computing node. Correspondingly, the computing node receives the service response packet from the to-be-processed service member.

After processing the third service request packet, the to-be-processed service member sends the service response packet to the computing node. The service response packet includes the source address information, and the source address information is the address information of the to-be-processed service member.

Step S309: The computing node modifies the source address information in the service response packet to the address information of the to-be-processed load balance instance based on the connection information.

When receiving the service response packet, the computing node performs source network address translation on the source address information of the service response packet, to translate the source address information from the address information of the to-be-processed service member into the address information of the to-be-processed load balance instance, in other words, to translate the address information of the to-be-processed service member into the address information of the to-be-processed load balance instance; and uses the address information of the to-be-processed load balance instance as the source address information.

The computing node may perform source network address translation on the source address information of the service response packet based on the connection information.

After performing source network address translation on the source address information of the service response packet, the computing node may encapsulate the translated service response packet and add the VXLAN header and the outer packet header.

Step S310: The computing node sends the translated service response packet to the service request end.

The computing node may send the modified service response packet to the service request end based on the connection information, to be specific, sends the translated service response packet to the service request end based on the address information of the service request end that is recorded in the connection information and that corresponds to the address information of the to-be-processed load balance instance.

In a possible implementation, the computing node sends the translated and encapsulated service response packet to the service request end.

The computing node directly sends the translated service response packet to the service request end by using the router.

It may be understood that a transmission path of the service response packet is: the to-be-processed service member→the computing node→the service request end. A transmission path of the service request packet is: the service request end→the load balance node→the computing node→the to-be-processed service member. It can be learned that the service response packet does not pass through the load balance node, and the computing node directly sends the service response packet to the client by using the router, to respond to the service request packet sent by the client.

In the embodiment in FIG. 3, when receiving the first service request packet from the client, the load balance node determines the to-be-processed service member, and modifies the destination MAC address in the first service request packet to the MAC address of the to-be-processed service member, so that the service request packet can be correctly forwarded. When the destination MAC address is modified, and the source address information is not modified, transparent transmission of the source address information can be implemented. In addition, in a process of implementing the transparent transmission of the source address information, a field or a valid payload in the service request packet is not modified, and an operating system of a service member does not need to be modified, and this does not lead to performance loss. In a process of sending the service response packet, because the service response packet does not pass through the load balance node, the computing node directly sends the service response packet to the client by using the router, so that the service request packet can be quickly responded.

It may be understood that the embodiment in FIG. 3 is a data plane interaction procedure, and implementation of the data plane interaction procedure depends on the configuration information delivered in a control plane procedure.

The control plane procedure may include the following steps:

A. A load balancer receives an operation instruction and operation information that are entered by an administrator. The operation instruction may include creating a load balance instance, creating a listener, creating a resource pool, creating a health checker, adding a service member to the resource pool, and the like. The operation information may include load balance instance information, listener information, resource pool information, health checker information, service member information, and the like.

B. The load balancer writes all configuration information into a database, in other words, stores the configuration information. The configuration information may be generated based on the operation instruction and the operation information.

C. The load balancer delivers first configuration information to the load balance node. The first configuration information may include load balance instance information, listener information, resource pool information, health checker information, service member information, and the like.

D. The load balancer delivers second configuration information to a computing node. The second configuration information may include a mapping relationship between address information of all load balance instances and address information of all service members. It should be noted that step C and step D may be performed at the same time.

The foregoing describes in detail the method provided in this embodiment of this application. The following describes the apparatus provided in this embodiment of this application.

Figure 4:
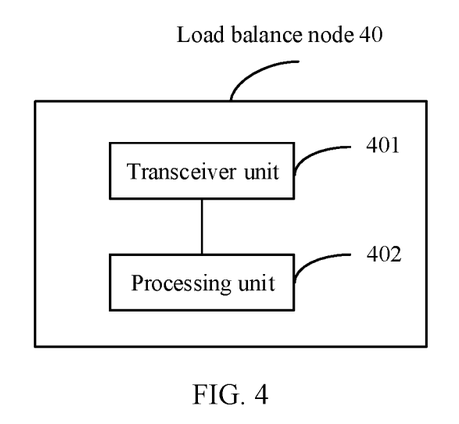
FIG. 4 is a schematic diagram of a logical structure of a load balance node according to an embodiment of this application.

FIG. 4 is a schematic diagram of a logical structure of a load balance node according to an embodiment of this application. The load balance node 40 may be the load balance node 201 in FIG. 2, and the load balance node 40 may include a transceiver unit 401 and a processing unit 402.

The transceiver unit 401 is configured to receive a first service request packet from a service request end. The first service request packet includes address information of the service request end, address information of a to-be-processed load balance instance, and a MAC address of a load balance node. The to-be-processed load balance instance is a load balance instance configured on the load balance node.

The processing unit 402 is configured to determine a to-be-processed service member based on the address information of the to-be-processed load balance instance. The to-be-processed service member is configured to process a service request packet related to the first service request packet.

The processing unit 402 is further configured to modify the MAC address of the load balance node in the first service request packet to a MAC address of the to-be-processed service member, to obtain a second service request packet. The second service request packet includes the address information of the service request end, the address information of the to-be-processed load balance instance, and the MAC address of the to-be-processed service member.

The transceiver unit 401 is further configured to send the second service request packet to a computing node to which the to-be-processed service member belongs.

The address information includes an IP address and a port identifier.

In a possible implementation, when the processing unit 402 is configured to determine the to-be-processed service member based on the address information of the to-be-processed load balance instance, the processing unit 402 is specifically configured to: query, based on the IP address and the port identifier of the to-be-processed load balance instance, a resource pool corresponding to the to-be-processed load balance instance; and determine the to-be-processed service member from the resource pool according to a load balance algorithm corresponding to the resource pool.

In a possible implementation, when the processing unit 402 is configured to query, based on the IP address and the port identifier of the to-be-processed load balance instance, the resource pool corresponding to the to-be-processed load balance instance, the processing unit 402 is specifically configured to: determine the to-be-processed load balance instance based on the IP address of the to-be-processed load balance instance; query, based on the port identifier of the to-be-processed load balance instance, a listener associated with the to-be-processed load balance instance; and query a resource pool bound to the listener and determine the resource pool as the resource pool corresponding to the to-be-processed load balance instance.

The load balance node 40 may implement the function of the load balance node in the foregoing method embodiment. For a detailed execution process of each unit in the load balance node 40, refer to an execution step of the load balance node in the foregoing method embodiment. Details are not described herein again.

Figure 5:
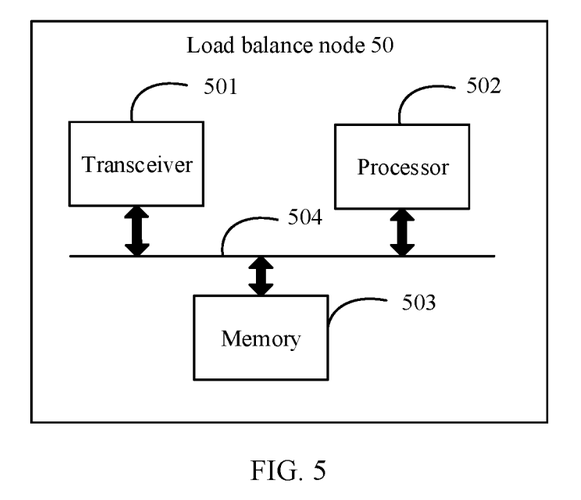
FIG. 5 is a simplified schematic diagram of an entity structure of a load balance node according to an embodiment of this application.

FIG. 5 is a simplified schematic diagram of an entity structure of a load balance node according to an embodiment of this application. The load balance node 50 may be the load balance node 201 in FIG. 2, and the load balance node 50 may include a transceiver 501, a processor 502, and a memory 503. The transceiver 501, the processor 502, and the memory 503 may be connected to each other by using the bus 504, or may be connected to each other in another manner. A related function implemented by the transceiver unit 401 in FIG. 4 may be implemented by using the transceiver 501. A related function implemented by the processing unit 402 in FIG. 4 may be implemented by using the processor 502.

The transceiver 501 is configured to send data and/or signaling, and receive data and/or signaling. In this embodiment of this application, the transceiver 501 is configured to: communicate with a service request end (e.g., a client), and receive a service request packet sent by the service request end, in other words, perform the step S301 in the embodiment shown in FIG. 3; is further configured to: communicate with a computing node, and send a second service request packet to the computing node, in other words, perform the step S304 in the embodiment shown in FIG. 3; and is further configured to: communicate with a load balancer, and receive configuration information delivered by the load balancer.

The processor 502 may include one or more processors, for example, include one or more central processing units (CPU). When the processor 502 is a CPU, the CPU may be a single-core CPU or a multi-core CPU. In this embodiment of this application, the processor 502 is configured to: determine a to-be-processed service member, and modify a destination MAC address in the first service request packet to obtain the second service request packet, in other words, perform the steps S302 and S303 in the embodiment in FIG. 3.

The memory 503 includes but is not limited to a random access memory (RAM), a read-only memory (ROM), an erasable programmable read-only memory (EPROM), or a compact disc read-only memory (CD-ROM). The memory 503 is configured to store a related instruction and related data. The memory 503 is configured to store program code and data of the load balance node 50. In this embodiment of this application, the memory 503 may be configured to store the configuration information delivered by the load balancer.

It may be understood that FIG. 5 shows only a simplified design of the load balance node 501. In actual application, the load balance node 501 may further include other necessary elements, including but not limited to any quantity of transceivers, processors, controllers, memories, communications units, and the like. All apparatuses that can implement this application fall within the protection scope of this application.

Figure 6:
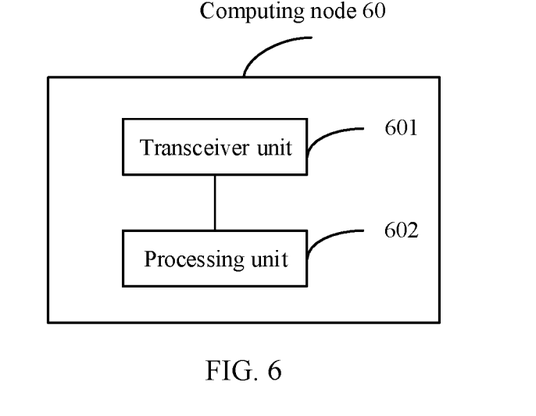
FIG. 6 is a schematic diagram of a logical structure of a computing node according to an embodiment of this application.

FIG. 6 is a schematic diagram of a logical structure of a computing node according to an embodiment of this application. The computing node 60 may be the computing node 202*a* or the computing node 202*b* in FIG. 2. The computing node 60 may include a transceiver unit 601 and a processing unit 602.

The transceiver unit 601 is configured to receive a second service request packet from a load balance node. The second service request packet includes address information of a service request end, address information of a to-be-processed load balance instance, and a MAC address of a to-be-processed service member. The to-be-processed load balance instance is a load balance instance configured on the load balance node. The second service request packet is obtained by the load balance node by modifying a MAC address of the load balance node in the first service request packet. The first service request packet is a service request packet sent by the service request end to the load balance node.

The processing unit 602 is configured to modify the address information of the to-be-processed load balance instance in the second service request packet to address information of the to-be-processed service member based on configuration information, to obtain a third service request packet.

The transceiver unit 601 is further configured to send the third service request packet to the to-be-processed service member based on the MAC address of the to-be-processed service member.

In a possible implementation, the transceiver unit 601 is further configured to receive configuration information from a load balancer. The configuration information includes a mapping relationship between the address information of the load balance instance and address information of a service member deployed on the computing node 60.

The address information includes an IP address and a port identifier.

In a possible implementation, the processing unit 602 is further configured to record connection information. The connection information includes the address information of the service request end, the address information of the to-be-processed load balance instance, and the address information of the to-be-processed service member.

In a possible implementation, the transceiver unit 601 is further configured to receive a service response packet from the to-be-processed service member. The service response packet includes the address information of the to-be-processed service member. The processing unit 602 is further configured to modify the address information of the to-be-processed service member in the service response packet to the address information of the to-be-processed load balance instance based on the connection information. The transceiver unit 601 is further configured to send the modified service response packet to the service request end based on the connection information.

The computing node 60 may implement a function of the computing node in the foregoing method embodiment. For a detailed execution process of each unit in the computing node 60, refer to an execution step of the computing node in the foregoing method embodiment. Details are not described herein again.

Figure 7:
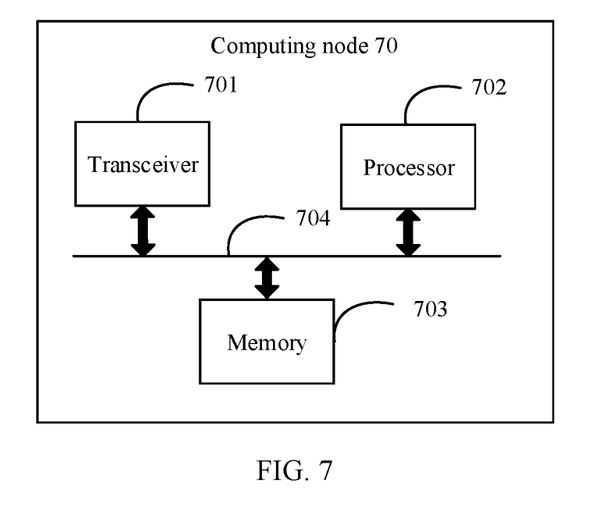
FIG. 7 is a simplified schematic diagram of an entity structure of a computing node according to an embodiment of this application.

FIG. 7 is a simplified schematic diagram of an entity structure of a computing node according to an embodiment of this application. The computing node 70 may be the computing node 202*a* or the computing node 202*b* in FIG. 2. The computing node 70 may include a transceiver 701, a processor 702, and a memory 703. The transceiver 701, the processor 702, and the memory 703 may be connected to each other by using the bus 704, or may be connected to each other in another manner. A related function implemented by the transceiver unit 601 in FIG. 6 may be implemented by using the transceiver 701. A related function implemented by the processing unit 602 in FIG. 6 may be implemented by using the processor 702.

The transceiver 701 is configured to send data and/or signaling, and receive data and/or signaling. In this embodiment of this application, the transceiver 701 is configured to: communicate with a load balance node, and receive a second service request packet from the load balance node, in other words, perform the step S304 in the embodiment shown in FIG. 3; is further configured to: communicate with a to-be-processed service member, and send a third service request packet to the to-be-processed service member, in other words, perform the step S306 in the embodiment shown in FIG. 3; and further configured to: communicate with a load balancer, and receive configuration information delivered by the load balancer. The transceiver 701 may be a network interface card (NIC), or the like.

The processor 702 may include one or more processors, for example, include one or more CPUs. When the processor 502 is a CPU, the CPU may be a single-core CPU or a multi-core CPU. In this embodiment of this application, the processor 702 is configured to modify destination address information of the second service request packet to obtain a third service request packet, in other words, perform the step S305 in the embodiment shown in FIG. 3.

The memory 703 includes but is not limited to a RAM, a ROM, an EPROM, or a CD-ROM. The memory 703 is configured to store a related instruction and related data. The memory 703 is configured to store program code and data of the computing node 70. In this embodiment of this application, the memory 703 may be configured to store the configuration information delivered by the load balancer.

It may be understood that FIG. 7 shows only a simplified design of the computing node. In actual application, the computing node may further include other necessary elements, including but not limited to any quantity of transceivers, processors, controllers, memories, communications units, and the like. All apparatuses that can implement this application fall within the protection scope of this application.

In an embodiment of this application, a load balance system is further provided, and includes a load balance node, a computing node, and a to-be-processed service member, and may further include a service request end.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes: any medium that can store program code, such as a ROM, a random access memory RAM, a magnetic disk, or an optical disc. Therefore, in another embodiment of this application, a computer-readable storage medium is provided. The computer-readable storage medium stores an instruction. When the instruction is run on a computer, the computer is enabled to perform the methods in the foregoing aspects.

In another embodiment of this application, a computer program product including an instruction is further provided. When the computer program product runs on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In a plurality of embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state drive (SSD)), or the like.

What is claimed is:

1. A load balance method, comprising:
receiving, by a load balance node, a first service request packet from a service request end, wherein the first service request packet comprises address information of the service request end, address information of a to-be-processed load balance instance, and a media access control (MAC) address of the load balance node, and the to-be-processed load balance instance is a load balance instance from among a plurality of load balance instances configured on the load balance node, and wherein the address information of the service request end comprises an IP address and a port identifier, and the address information of the to-be-processed load balance instance comprises an IP address and a port identifier;
determining, by the load balance node, a to-be-processed service member based on the address information of the to-be-processed load balance instance, wherein the to-be-processed service member is configured to process the first service request packet;
modifying, by the load balance node, the MAC address of the load balance node in the first service request packet to a MAC address of the to-be-processed service member, to obtain a second service request packet, wherein the second service request packet comprises the address information of the service request end, the address information of the to-be-processed load balance instance, and the MAC address of the to-be-processed service member; and
sending, by the load balance node, the second service request packet to a computing node to which the to-be-processed service member belongs,
wherein the determining, by the load balance node, the to-be-processed service member based on the address information of the to-be-processed load balance instance comprises:
querying, by the load balance node based on the IP address and the port identifier of the to-be-processed load balance instance, a resource pool corresponding to the to-be-processed load balance instance; and
determining, by the load balance node, the to-be-processed service member from the resource pool according to a load balance algorithm corresponding to the resource pool; and
wherein the querying, by the load balance node based on the IP address and the port identifier of the to-be-processed load balance instance, the resource pool corresponding to the to-be-processed load balance instance comprises:
determining, by the load balance node, the to-be-processed load balance instance based on the IP address of the to-be-processed load balance instance;
querying, by the load balance node based on the port identifier of the to-be-processed load balance instance, a listener associated with the to-be-processed load balance instance; and
querying, by the load balance node, a resource pool bound to the listener, and determining the resource pool as the resource pool corresponding to the to-be-processed load balance instance.

2. A load balance node, wherein the load balance node comprises a processor, a transceiver, and a memory, the transceiver is configured to receive and send information, the memory is configured to store computer-executable instructions, the processor is connected to the memory and the transceiver by using a bus, and the processor is configured to execute the computer-executable instructions stored in the memory to cause the load balance node to perform the following steps:
controlling the transceiver to receive a first service request packet from a service request end, wherein the first service request packet comprises address information of the service request end, address information of a to-be-processed load balance instance, and a MAC address of the load balance node, and the to-be-processed load balance instance is a load balance instance from among a plurality of load balance instances configured on the load balance node, and wherein the address information of the service request end comprises an IP address and a port identifier, and the address information of the to-be-processed load balance instance comprises an IP address and a port identifier;
determining a to-be-processed service member based on the address information of the to-be-processed load balance instance, wherein the to-be-processed service member is configured to process the first service request packet;
modifying the MAC address of the load balance node in the first service request packet to a MAC address of the to-be-processed service member, to obtain a second service request packet, wherein the second service request packet comprises the address information of the service request end, the address information of the to-be-processed load balance instance, and the MAC address of the to-be-processed service member; and
controlling the transceiver to send the second service request packet to a computing node to which the to-be-processed service member belongs,
wherein when the load balance node performs the determining a to-be-processed service member based on the address information of the to-be-processed load balance instance, the load balance node is specifically configured to: query, based on the IP address and the port identifier of the to-be-processed load balance instance, a resource pool corresponding to the to-be-processed load balance instance; and determine the to-be-processed service member from the resource pool according to a load balance algorithm corresponding to the resource pool; and
wherein responsive to the load balance node performing the querying, based on the IP address and the port identifier of the to-be-processed load balance instance, the resource pool corresponding to the to-be-processed load balance instance, the load balance node is specifically configured to: determine the to-be-processed load balance instance based on the IP address of the to-be-processed load balance instance; query, based on the port identifier of the to-be-processed load balance instance, a listener associated with the to-be-processed load balance instance; and querying a resource pool bound to the listener, and determine the resource pool as the resource pool corresponding to the to-be-processed load balance instance.

* * * * *